United States Patent
Masutani et al.

(10) Patent No.: US 9,645,457 B2
(45) Date of Patent: May 9, 2017

(54) ARRAY SUBSTRATE, DISPLAY DEVICE, AND METHOD FOR MANUFACTURING THE ARRAY SUBSTRATE

(75) Inventors: Yuichi Masutani, Tokyo (JP); Shigeaki Noumi, Tokyo (JP); Takeshi Shimamura, Tokyo (JP); Masaru Aoki, Koushi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 186 days.

(21) Appl. No.: 11/943,976

(22) Filed: Nov. 21, 2007

(65) Prior Publication Data

US 2008/0131668 A1   Jun. 5, 2008

(30) Foreign Application Priority Data

Nov. 22, 2006  (JP) ................ 2006-315579
Oct. 17, 2007  (JP) ................ 2007-270090

(51) Int. Cl.
  *B44C 1/17*  (2006.01)
  *G03C 5/00*  (2006.01)
  *G02F 1/1362* (2006.01)

(52) U.S. Cl.
  CPC ........ *G02F 1/1362* (2013.01); *G02F 2201/48* (2013.01); *Y10T 428/24802* (2015.01)

(58) Field of Classification Search
  CPC . G02F 1/1362; G02F 2201/48; H01L 29/772; H01L 29/78; H01L 29/786; H01L 29/78645
  USPC .................. 438/149–151; 430/314
  See application file for complete search history.

(56) References Cited

U.S. PATENT DOCUMENTS

| | | | |
|---|---|---|---|
| 4,389,481 A * | 6/1983 | Poleshuk et al. | 438/160 |
| 6,287,899 B1 * | 9/2001 | Park | H01L 21/0274 |
| | | | 257/E21.027 |
| 6,884,569 B2 * | 4/2005 | Nakashima et al. | 430/316 |
| 2002/0028411 A1 | 3/2002 | Park et al. | |
| 2004/0089900 A1 * | 5/2004 | Ishikawa et al. | 257/347 |
| 2005/0024549 A1 * | 2/2005 | Gotoh | G02F 1/1368 |
| | | | 349/43 |
| 2005/0078233 A1 * | 4/2005 | Lim et al. | 349/43 |
| 2005/0112790 A1 * | 5/2005 | Lan et al. | 438/30 |

(Continued)

FOREIGN PATENT DOCUMENTS

| | | |
|---|---|---|
| JP | 2000-66240 | 3/2000 |
| JP | 2000-164584 | 6/2000 |

(Continued)

OTHER PUBLICATIONS

Office Action issued Mar. 26, 2013 in Japanese Application No. 2007-270090 (With English Translation).

*Primary Examiner* — Prashant J Khatri
(74) *Attorney, Agent, or Firm* — Oblon, McClelland, Maier & Neustadt, L.L.P.

(57) ABSTRACT

An array substrate has regions in which an intermediate resist film thickness is formed and processed by an intermediate exposure amount which does not completely expose a resist, respectively on a drain electrode, source terminal, and a common connection wiring which are made of a second conductive film. Thin film patterns or a common wiring made of a first conductive film is formed in substantially entire regions on the bottom layers of the regions so that the heights from a substrate are substantially the same.

17 Claims, 8 Drawing Sheets

(56) References Cited

U.S. PATENT DOCUMENTS

2006/0022199 A1  2/2006  Ishiga et al.
2006/0269849 A1* 11/2006  Lee .................................. 430/5

FOREIGN PATENT DOCUMENTS

| | | |
|---|---|---|
| JP | 2001-358343 | 12/2001 |
| JP | 2002-141512 | 5/2002 |
| JP | 2002-246607 | 8/2002 |
| JP | 2004-295073 | 10/2004 |
| JP | 2004-302417 | 10/2004 |
| JP | 2006-41161 | 2/2006 |
| JP | 2006-108147 | 4/2006 |
| JP | 2006-235134 | 9/2006 |
| KR | 2000-0038544 | 7/2000 |

* cited by examiner

ARRAY SUBSTRATE, DISPLAY DEVICE, AND METHOD FOR MANUFACTURING THE ARRAY SUBSTRATE

This application claims priority from Japanese Patent Applications No. 2006-315579 filed on Nov. 22, 2006 and No. 2007-270090 filed on Oct. 17, 2007, the entire subject matter of which is incorporated herein by reference.

BACKGROUND OF THE INVENTION

1. Field of the Invention

The present invention relates to an array substrate on which a plurality of layers of thin film patterns are formed, a display device, and a method for manufacturing the array substrate. For example, these are preferably applicable to liquid crystal display devices.

2. Description of the Related Art

Recently, liquid crystal display devices are thin in shape, light in weight, and low in power consumption and are used as a typical display device. As a method for reducing the production cost of liquid crystal display devices, it is effective to reduce a photo lithography step in a production process of an array substrate for forming thin film transistors (hereinafter, referred to as TFT). Here, in one photo lithography step, there is a method called gray tone (hereinafter, referred to as GT) exposure or half tone (hereinafter, referred to as HT) exposure to form: a region which has a resist thickness of a resist left unexposed; a region from which a resist is removed by complete exposure; and a region which has an intermediate resist thickness processed by an intermediate exposure amount which does not completely expose a resist. GT exposure provides an intermediate exposure amount by placing a fine thin film pattern of a resolution limit or less of an exposure apparatus on a photomask. HT exposure provides an intermediate exposure amount by forming a semi-permeable membrane on a photomask. In particular, as described in JP-A-2000-66240 (FIG. 25 to FIG. 30), a method for reducing a photo lithography step is made practicable by performing GT exposure or HT exposure on a channel part of a channel etch type TFT.

In addition, as described in JP-A-2006-41161 (FIG. 4), there is a method which obtains a region having an intermediate resist thickness, by performing a two-stage exposure with a second exposure of an intermediate exposure amount added to a first exposure in one photo lithography step. In JP-A-2006-41161, a drain electrode made of a multilayer film containing Al on the top layer. JP-A-2006-41161 discloses performing the two-stage exposure or the HT exposure on a region from which Al of the top layer of the drain electrode corresponding to a contact hole is removed, in order to control a contact resistance between a pixel electrode and the drain electrode that are made of a conductive oxide film such as ITO.

A photo lithography step has a problem that it is likely to be influenced by photomask accuracy (variation in permeability), illuminance distribution of an exposure apparatus, resist thickness distribution of resist coating, variation in developing, and the like, and an intermediate resist thickness is likely to vary when an intermediate exposure which does not completely expose a resist is performed. However, if the photo lithography step is applied only to a channel part of a TFT as in JP-A-2000-66240, since a type of thin film pattern has the same film composition, variation in the intermediate resist film thickness does not pose such a critical problem. However, when an intermediate exposure is performed on both a contact part of a drain electrode shown in JP-A-2006-41161 and a contact part with wiring, terminal, or electrode having various thin film patterns at the same photo lithography step, heights of various thin film patterns formed on a substrate from the substrate are different from each other due to film compositions on the bottom layer. Accordingly, since a resist film thickness does not become uniform, variation in intermediate resist film thickness is further increased after the photo lithography. As a result, there is a problem that in a region where the intermediate resist film thickness is thin, even a necessary thin film pattern is eliminated in a later etching step. Further, in a region where the intermediate resist film thickness is thick, an unnecessary thin film pattern remains as a remaining film in a later step.

SUMMARY OF THE INVENTION

The present invention has been achieved to solve the problem mentioned above, in particular, to provide an array substrate, a display device, and a method for manufacturing the array substrate, which contribute to a reduction in cost, increase in yield, and expansion of the process margin of an intermediate resist film thickness formed by reducing variation in the intermediate resist thickness after a photo lithography especially when an intermediate exposure is performed on a region where a plurality of types of thin film patterns are formed at the same photo lithography step.

An array substrate of the present invention includes a plurality of types of thin film patterns on which a resist with an intermediate resist film is formed and processed by an intermediate exposure amount which does not completely expose, wherein the plurality of types of thin film patterns are formed so that heights of the plurality of types of thin film patterns from a substrate are substantially the same.

A method for manufacturing an array substrate of the present invention includes forming a plurality of types of thin film patterns including forming a resist and processing the resist to form an intermediate resist film thickness by an intermediate exposure amount which does not completely expose a resist, and forming a thin film pattern in substantially the entire region below the plurality of types of thin film patterns such that heights of the plurality of types of thin film patterns are substantially the same.

According to the present invention, intermediate resist film thicknesses in a plurality of types of regions which are processed with intermediate resist film formed substantially uniform. Accordingly, the intermediate resist film thicknesses are made uniform after a photolithography, a process margin is expanded in a later process, yield is improved, and an array substrate, a display device, and a method for manufacturing the array substrate can be provided at a low cost.

DETAILED DESCRIPTION OF THE PREFERRED EMBODIMENTS

Hereinafter, embodiments of the present invention are described by describing an array substrate of a liquid crystal display device with reference to the figures. Additionally, the same symbols denote the same parts or equivalent parts in all figures to explain the embodiments below, and overlapping explanation is omitted in principle.

Embodiment 1

Figure 1:
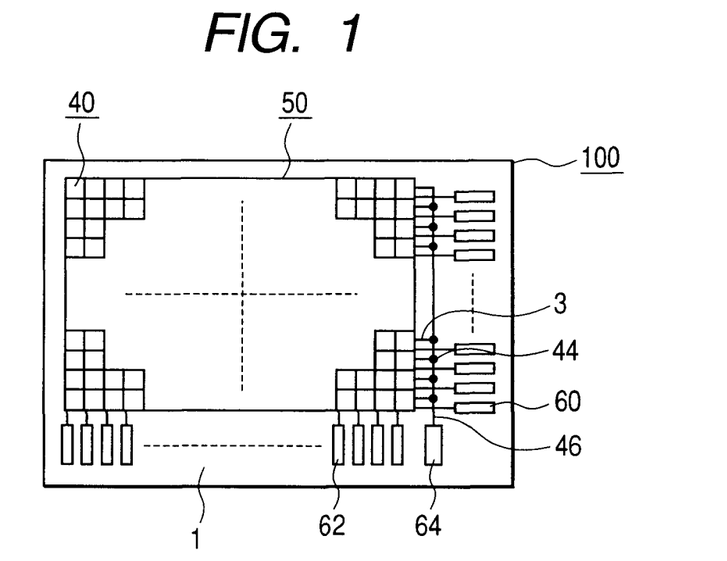
FIG. 1 is a plan view showing an array substrate of a liquid crystal display device according to embodiment 1.
Figure 2:
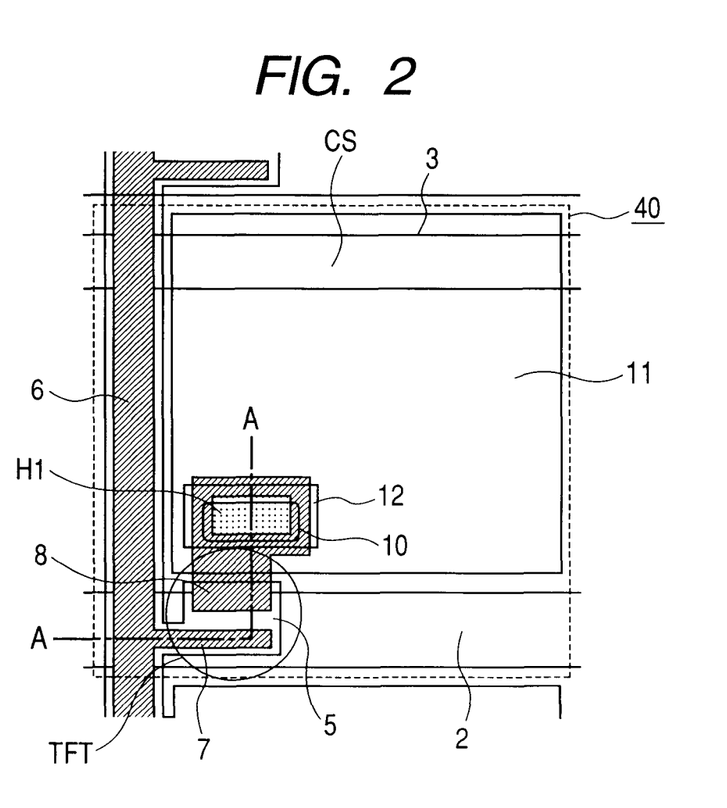
FIG. 2 is a plan view showing a pixel of a display part in FIG. 1 according to embodiment 1.
Figure 3:
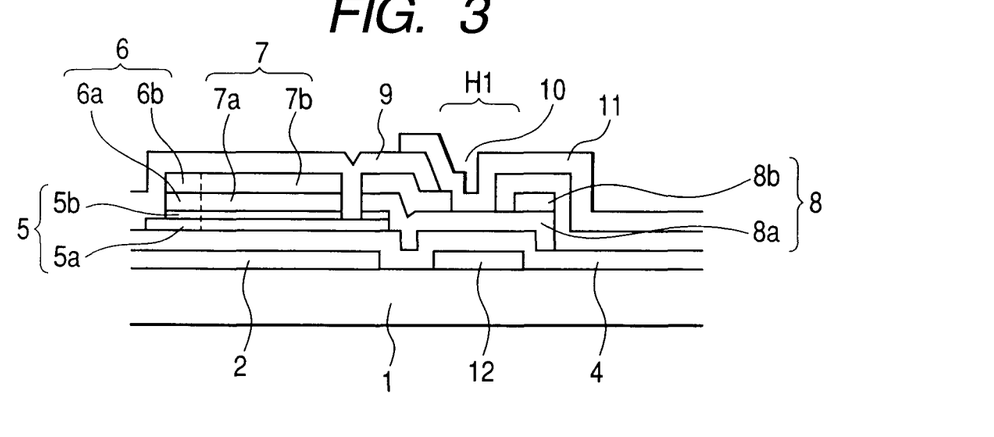
FIG. 3 is a cross-sectional view taken along a line A-A of FIG. 2 according to embodiment 1.
Figure 4:
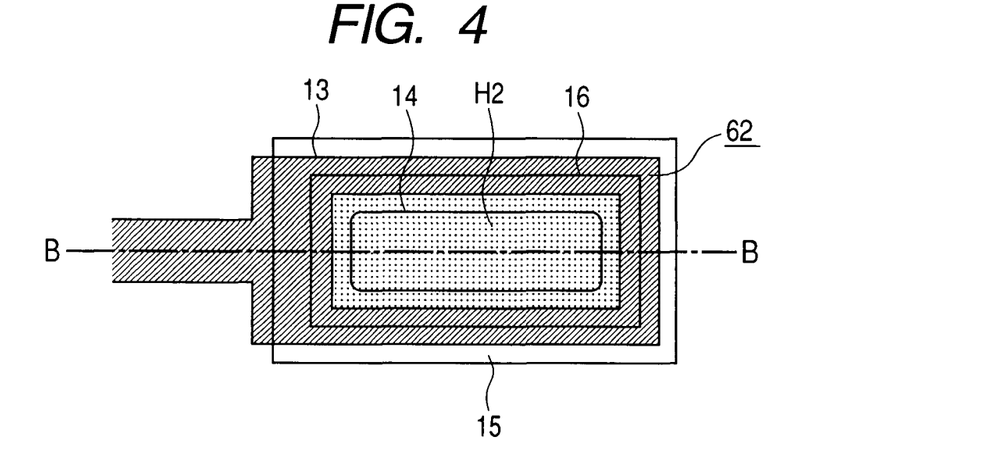
FIG. 4 is a plan view showing a portion where a source terminal of FIG. 1 is enlarged according to embodiment 1.
Figure 5:
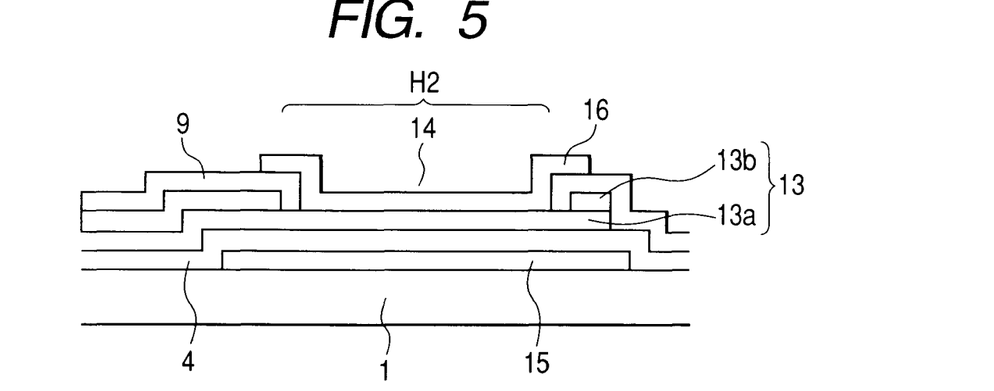
FIG. 5 is a cross-sectional view taken along a line B-B of FIG. 2 according to embodiment 1.
Figure 6:
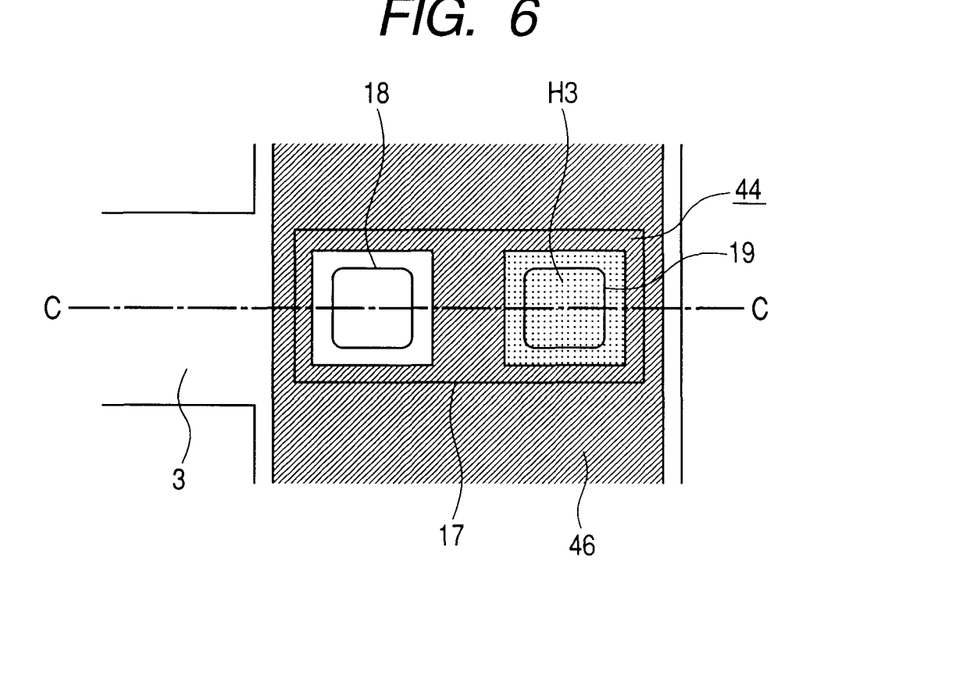
FIG. 6 is a plan view showing a portion where a common wiring conversion part of FIG. 1 is enlarged according to embodiment 1.
Figure 7:
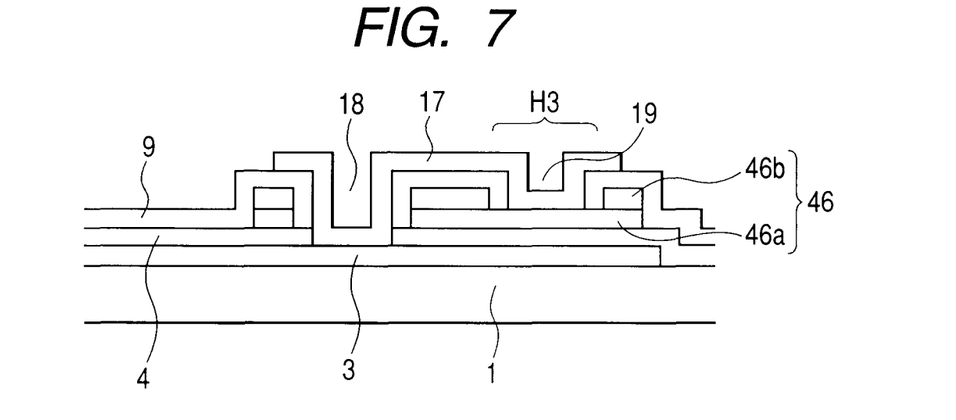
FIG. 7 is a cross-sectional view taken along a line C-C of FIG. 6 according to embodiment 1.

FIG. 1 is a plan view showing an array substrate of a liquid crystal display device according to embodiment 1. FIG. 2 is a plan view showing a pixel in FIG. 1. FIG. 3 is a cross-sectional view taken along a line A-A of FIG. 2. FIG. 4 is a plan view showing a portion where a source terminal of FIG. 1 is enlarged. FIG. 5 is a cross-sectional view taken along a line B-B of FIG. 4. FIG. 6 is a plan view showing a portion where a common wiring conversion part of FIG. 1 is enlarged. FIG. 7 is a cross-sectional view taken along a line C-C of FIG. 6.

In FIG. 1, a display part 50 consisting of a plurality of pixels 40 arranged in a matrix on a substrate 1 made of glass or the like are formed on an array substrate 100 composing a main part of a liquid crystal display device. Gate terminals 60, source terminals 62, and a common connection terminal 64 are formed on the periphery of the display part 50. Further, common wirings 3 forming retention capacity of the pixels 40 are pulled out and connected via a common wiring conversion part 44 to a common connection terminal 64 by a common connection wiring 46.

The array substrate 100 and a counter substrate not shown in the figure are bonded together, and a liquid crystal is sealed therebetween and performs display operation by a voltage being supplied to the liquid crystal. Further, polarization plates not shown in the figure are bonded to the array substrate 100 and the counter substrate, and a backlight is placed on the back surface of the array substrate 100, to constitute the liquid crystal display device.

Next, in FIGS. 2 and 3, a pixel 40 is configured by a gate wiring 2, a common wiring 3, a source wiring 6, a TFT, a pixel electrode 11, and the like. The gate wiring 2 and the common wiring 3 are first conductive films, made of Al, Mo, Cr, Ti, Ta, Mo, W, or the like, and are formed parallel with spacing. A gate insulation film 4 made of an SiN film, an $SiO_2$ film, or the like is formed on the entire top layer. The source wiring 6 is formed in a direction orthogonal to the gate wiring 2, and a semiconductor film 5 for making the TFT is formed in the vicinity of the intersection. The semiconductor film 5 is a multilayer film with a semiconductor film 5b laminated on a semiconductor film 5a, where the semiconductor film 5a is formed into a channel, and the semiconductor film 5b is doped with an impurity. In this figure, the semiconductor film 5 is located continuously even under the source wiring 6 along the shape of the source wiring 6. However, the semiconductor film 5 may not need to be located under the source wiring 6.

A source electrode 7 is extended from the source wiring 6 into the direction of the gate wiring 2 on the gate wiring 2, and superimposed on the semiconductor film 5. Likewise, a drain electrode 8 is partially superimposed on the semiconductor film 5, and extended into a direction orthogonal to the gate wiring 2. The source wiring 6, the source electrode 7, and the drain electrode 8 are second conductive films, which are formed by a multilayer film composed of a lower layer film 6a, 7a, 8a made from Cr, Ti, Ta, Mo, W, or the like and an upper layer film 6b, 7b, 8b made of metal film made from such as Al.

The semiconductor film 5b doped with an impurity is removed, and the semiconductor film 5 formed into the channel of the TFT leaves only the semiconductor film 5a between the source electrode 7 and the drain electrode 8.

In a region H1 shown dotted in FIG. 2, the upper film layer 8b of the drain electrode 8 is removed, and the lower layer film 8a is exposed. An interlayer insulation film 9 is formed so as to cover the entirety of the pixel 40. A contact hole 10 is formed so as to be superimposed on the region H1 of the drain electrode 8.

The pixel electrode 11 made of a transparent conductive oxide film such as ITO is connected via the contact hole 10 to the lower layer film 8a of the drain electrode 8. Generally, since a contact resistance between the ITO of the conductive oxide film and oxidizable Al is high, the upper layer film 8b in the vicinity of the contact hole 10 is removed. Here, the contact hole 10 and the region H1 with the upper layer film 8b removed are slightly shifted in shape from each other.

Further, a retention capacity region CS where the common wiring 3 and the pixel electrode 11 are superimposed on each other forms the retention capacity to retain a supply voltage to the liquid crystal.

Here, a region shown by diagonal lines in FIG. 2 is a thin film pattern which is processed by forming a resist not exposed, in a photo lithography step which forms the source wiring 6, the source electrode 7, the drain electrode 8, and the like made of the second conductive film. The region H1 shown dotted is a thin film pattern which is processed by an intermediate exposure amount which does not completely expose a resist with an intermediate resist film thickness formed. Further, a thin film pattern 12 is made of the first conductive film at the same layer as the gate wiring 2 and the common wiring 3 in substantially the entire region on the bottom layer of the region H1.

Next, the source terminal 62 shown in FIG. 1 is described in detail. As shown in FIGS. 4 and 5, the source terminal 62 is formed of a source terminal film 13 formed of the second conductive film at the same layer as the source wiring 6, the source electrode 7, the drain electrode 8, and the like. The source terminal film 13 is made of a multilayer film having a lower layer film 13a made from Cr, Ti, Ta, Mo, W, or the like, and an upper layer film 13b made from Al or the like.

Further, the terminal surface of the source terminal 62 is covered by a surface terminal film 16 made of a conductive oxide film such as the ITO of the same as the pixel electrode 11 to improve corrosion resistance of the source terminal 62. Here, the source terminal 62 is connected via a contact hole 14 formed in the interlayer insulation film 9 to the lower layer film 13a in a region H2 from which the upper layer film 13b of the source terminal film 13 removed.

The source terminal film 13 is formed at the same step as a step for the source wiring 6, the source electrode 7, the drain electrode 8, and the like. A region shown by diagonal lines in FIG. 4 is a thin film pattern on which a resist not exposed is formed and processed in a photo lithography step for forming the source terminal film 13. The region H2 shown dotted is a thin film pattern on which an intermediate resist film thickness is formed and processed by an intermediate exposure amount which does not completely expose a resist. The upper layer film 13b of the source terminal film 13 is removed in the region H2. A thin film pattern 15 made of the first conductive film at the same layer as the gate wiring 2 and the common wiring 3 is formed on the bottom layer of the region H2 so as to make the height of the region H2 to be the same height as the region H1.

Next, the common wiring conversion part 44 shown in FIG. 1 is described in detail. As shown in FIGS. 6 and 7, the common wiring 3 forming the retention capacity region CS of the pixel 40 is connected via the common wiring conversion part 44 to the common connection wiring 46 orthogonal to the common wiring 3 on the outside of the display part 50. Then, the common connection terminal 64 is formed on one end of the common connection wiring 46. The common connection wiring 46 is composed of a lower layer film 46a made from Cr, Ti, Ta, Mo, W, or the like and an upper layer film 46b made of a metal film made from Al or the like, and is made of the second conductive film. The common connection terminal 64 has the same layer structure as the source terminal 62.

Here, a connection film 17 made of the conductive oxide film such as the ITO of the same as the pixel electrode 11 is connected between the common wiring 3 and the common connection wiring 46 via contact holes 18 and 19. The contact hole 18 is a part where the connection film 17 is connected to the common wiring 3 with a gate insulation film 4 and the interlayer insulation film 9 removed. The contact hole 19 is a part where the connection film 17 is connected to the common connection wiring 46 with the interlayer insulation film 9 removed.

Here, the common connection wiring 46 is formed at the same step as a step for the source wiring 6, the source electrode 7, the drain electrode 8, the source terminal film 13, and the like. A region shown by diagonal lines in FIG. 6 is a thin film pattern on which a resist not exposed is formed and processed in a photo lithography step for forming the common connection wiring 46. A region H3 shown dotted is a thin film pattern on which an intermediate resist film thickness is formed and processed. In the region H3, an upper layer film 46b of the common connection wiring 46 is removed. The common wiring 3 is formed on the bottom layer of the region H3 so that the common connection wiring 46 is superimposed on the common wiring 3. The construction to place the common wiring 3 on the bottom of the common connection wiring 46 and the common wiring conversion part 44 has been used for lowering a resistance of the common connection wiring 46 even conventionally.

With such a result, the thin film patterns 12, 15 made of the first conductive film or the common wiring 3 is formed in substantially entire regions on the bottom layers of the regions H1, H2, and H3 on which respective intermediate resist film thicknesses are formed and processed, heights of the drain electrode 8. Accordingly, the source terminal film 13, and the common connection wiring 46 made of the second conductive film from the substrate 1 are substantially the same.

Further, the gate wiring 2 is converted into a gate terminal film made of the second conductive film, to be connected to the gate terminal 60, and a thin film pattern made of the first conductive film is formed on the bottom layer of the gate terminal 60. Accordingly, the gate terminals 60 shown in FIG. 1 can have the same layer construction as the source terminal 62.

Next, an effect of a way that heights from the substrate of the plurality of types of thin film patterns on which intermediate resist film thicknesses is formed and processed are made substantially the same is described. FIG. 8 is a cross-sectional view showing steps which processes the plurality of types of thin film patterns on which the intermediate resist film thickness is formed.

FIG. 8 (a) shows an exposure stage of a photo lithography step. It is assumed that there are regions Ha, Hb, Hc, and Hd in which intermediate resist film thickness is formed on a thin film 22 on the substrate 1. Thin film patterns 20a, 20b with the same film thickness are formed on the bottom layers of the region Ha and the region Hb so that heights of the thin film 22 from the substrate 1 are substantially the same as each other. In contrast, a thin film pattern 20c thicker than the thin film patterns 20a, 20b is formed on the bottom layer at the region Hc. Therefore, such a thin film pattern is not formed on the bottom layer of the region Hd.

Figure 8A:
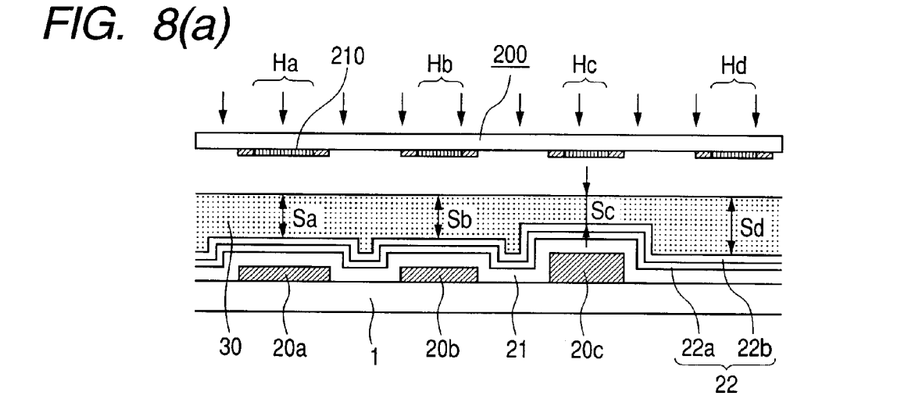
FIG. 8 is a cross-sectional view showing a step for processing a plurality of types of thin film patterns by forming an intermediate resist film thickness.
Figure 8B:
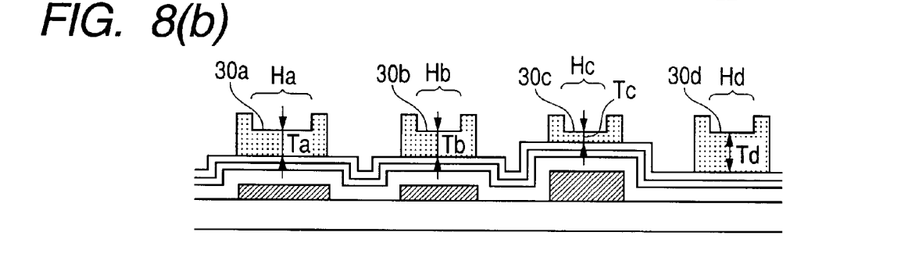
Figure 8C:
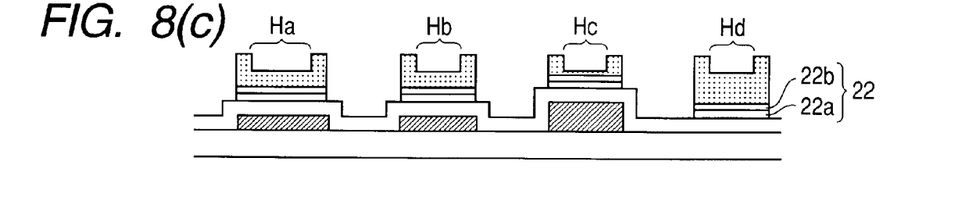
Figure 8D:
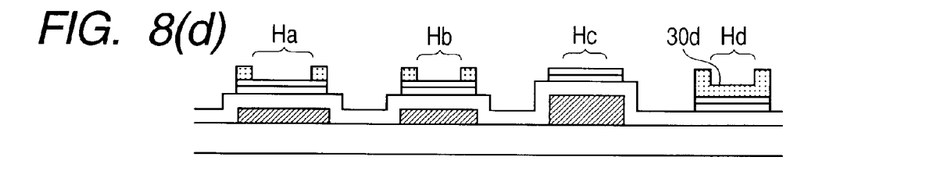
Figure 8E:
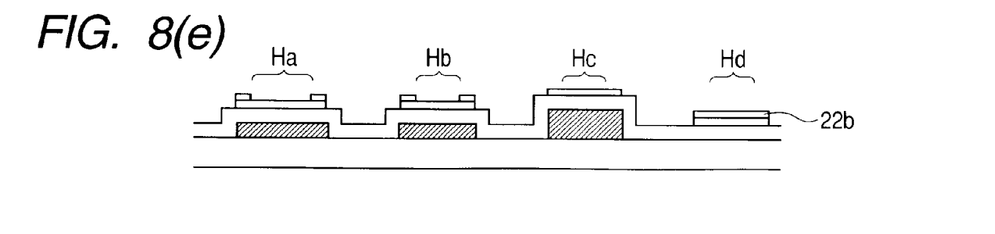
Figure 9:
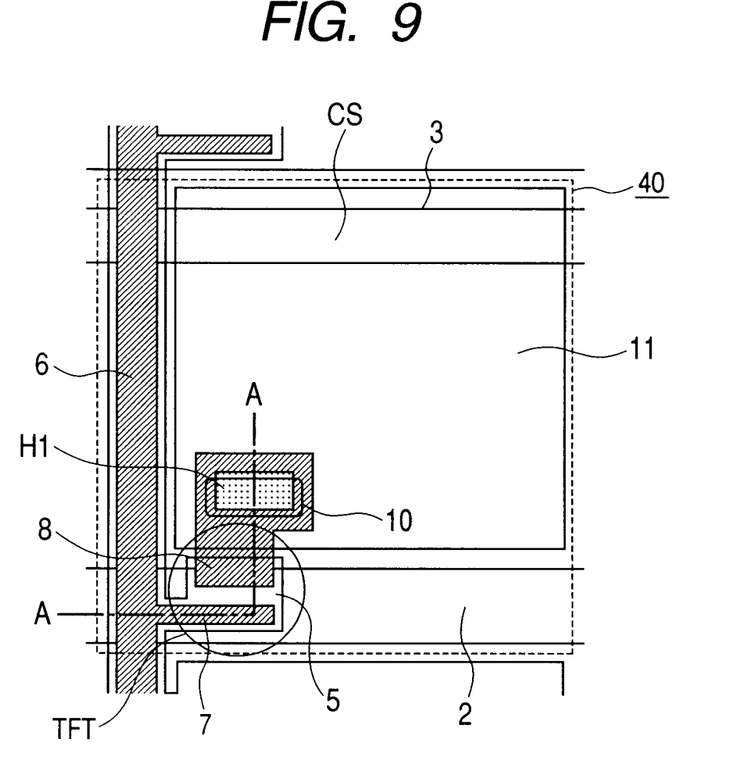
FIG. 9 is a plan view showing a pixel in a display part according to embodiment 2.
Figure 10:
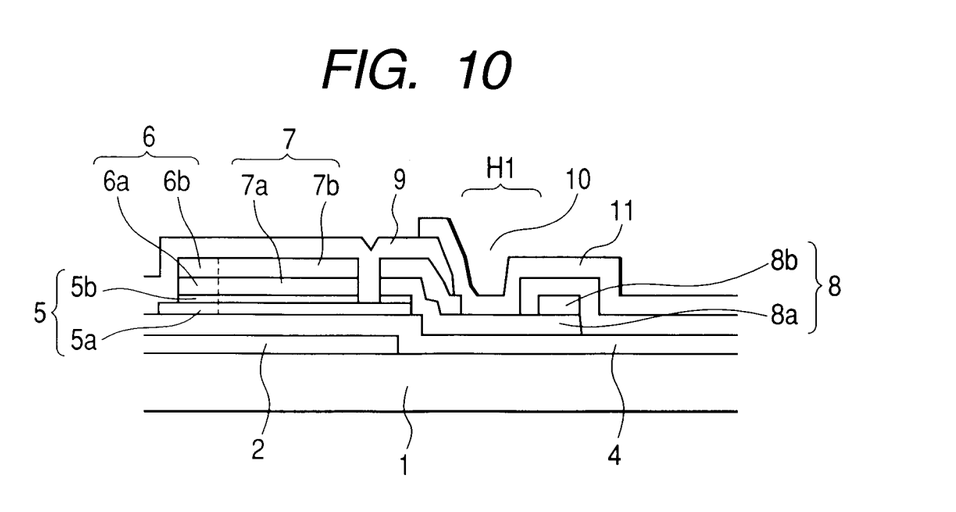
FIG. 10 is a sectional view taken along a line A-A of FIG. 9 according to embodiment 2.
Figure 11:
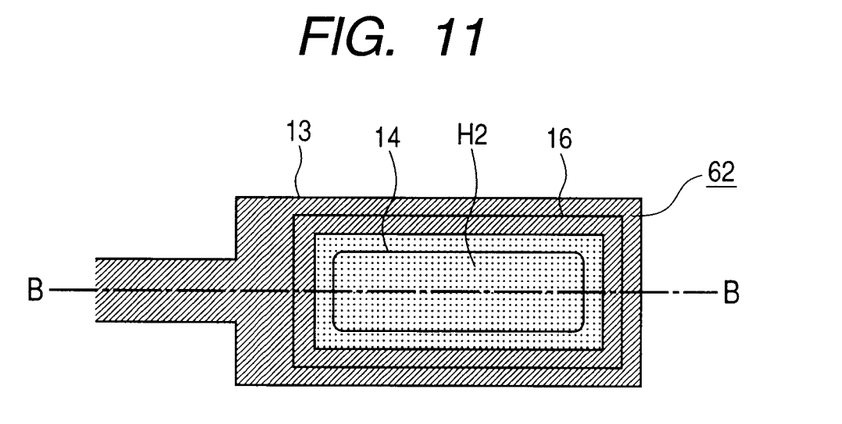
FIG. 11 is a plan view showing a portion where a source terminal is enlarged according to embodiment 2.
Figure 12:
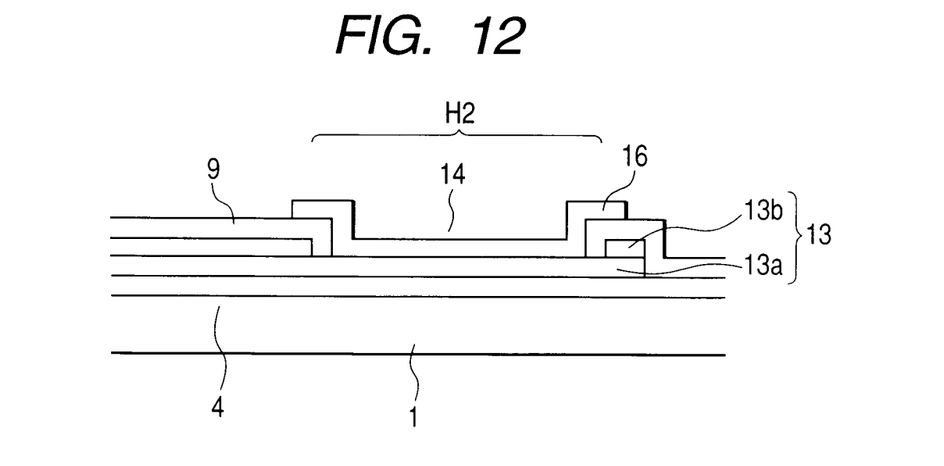
FIG. 12 is a sectional view taken along a line B-B of FIG. 11 according to embodiment 2.

An insulation film 21 and the thin film 22 on which the intermediate resist film thickness set is formed and processed across the entire surface of the next upper layers. The thin film 22 is made of a double-layer film composed of a lower layer film 22a and an upper layer film 22b. Further, in order to pattern/process the thin film 22, a resist 30 is coated by a spin coat method or the like. After the resist 30 is coated, since the surface of the resist 30 becomes substantially flat, resist film thicknesses Sa, Sb, Sc, Sd are different from each other at the regions Ha, Hb, Hc, Hd respectively. That is, the resist film thicknesses Sa, Sb at the regions Ha, Hb are equal, but the resist film thickness Sc becomes thinner than the resist film thicknesses Sa, Sb, and the resist film thickness Sd becomes thicker than the resist film thicknesses Sa, Sb.

Further, a GT mask 200 used in the photo lithography step has micro slits 210 formed corresponding to the regions Ha, Hb, Hc, Hd on which GT exposure is performed. The resist 30 is exposed through the GT mask 200.

FIG. 8 (b) is a step which develops the exposed resist 30 to form a resist pattern. Intermediate resist film thicknesses Ta, Tb, Tc, Td of intermediate resists 30a, 30b, 30c, 30d become different from one another at the regions Ha, Hb, Hc, Hd on which the GT exposure has been performed by using the GT mask 200. That is, the intermediate resist film thicknesses Ta, Tb at the regions Ha, Hb are equal, but the intermediate resist film thickness Tc at the region Hc becomes thinner than the intermediate resist thicknesses Ta, Tb, and the intermediate resist film thickness Td becomes thicker than the intermediate resist thicknesses Ta, Tb.

FIG. 8 (c) shows an etching step which removes both the lower layer film 22a and the upper layer film 22b of the thin film 22 with wet etching, dry etching, or the like by using the resist pattern formed in FIG. 8 (b).

FIG. 8 (d) is a step which performs an ashing treatment with oxygen plasma in order to remove the intermediate resists 30a, 30b, 30c, 30d left in the etching step in FIG. 8 (c). Here, if an optimum ashing treatment period to remove the intermediate resists 30a, 30b in the regions Ha, Hb is adopted, not only the intermediate resist 30c in the region Hc but also the entirety of the resists 30 in the periphery of the region Hc are eliminated. Further, the intermediate resist 30d is still left in the region Hd.

FIG. 8 (e) is a step which peels off a resist by removing the upper layer film 22b in the regions Ha, Hb, Hc, Hd with selective etching. As a result, normal thin film patterns with the upper layer film 22b removed are formed in the regions Ha, Hb. However, a defective thin film pattern with even the upper layer film 22b primarily left in the periphery of the region Hc removed is formed in the region Hc. The upper layer film 22b to be removed is left in the region Hd, and the region Hd becomes a defective thin film pattern. That is, when the intermediate resist film thicknesses Tc, Td are greatly different from the intermediate resist film thicknesses Ta, Tb, even if the ashing treatment period for the intermediate resists 30a, 30b, 30c, 30d is adjusted, since one of the region Hc and the region Hd becomes defective, there is no process margin.

Thus, in the drain electrode 8, the source terminal 62, and the common wiring conversion part 44, the thin film patterns 12, 15, and the common wiring 3 are formed in substantially entire regions on the bottom layers of the regions H1, H2, H3 and their heights from the substrate 1 are made substantially the same, where the drain electrode 8, the source terminal 62, and the common wiring conversion part 44 which are made of the second conductive film, the regions H1, H2, H3 in which intermediate resist film thicknesses are formed and processed by an intermediate exposure amount which does not completely expose a resist, and the thin film patterns 12, 15, and the common wiring 3 are formed of the first conductive film at the same layer as the gate wiring 2 and the common wiring 3. Accordingly, the intermediate resist thickness of the resist 30 can be made uniform. Further, since a process margin in consideration of ashing treatment period or the like for the intermediate resist can be expanded, the defective patterns are reduced, and the yield can be improved.

Embodiment 2

In Embodiment 1, the thin film patterns 12, 15, or the common wiring 3 which are made of the first conductive film are formed in substantially entire regions on the bottom layers of the regions H1, H2, H3 in which intermediate resist film thicknesses are formed are processed by an intermediate exposure amount which does not completely expose a resist. In contrast, in Embodiment 2, as shown in FIGS. 9 to 14 with respect to FIGS. 2 to 7 in Embodiment 1, the heights from the substrate 1 are made substantially the same by realizing a flat structure that the thin film patterns are not formed in substantially the entire region on the bottom layer of the regions H1, H2, H3.

Figure 13:
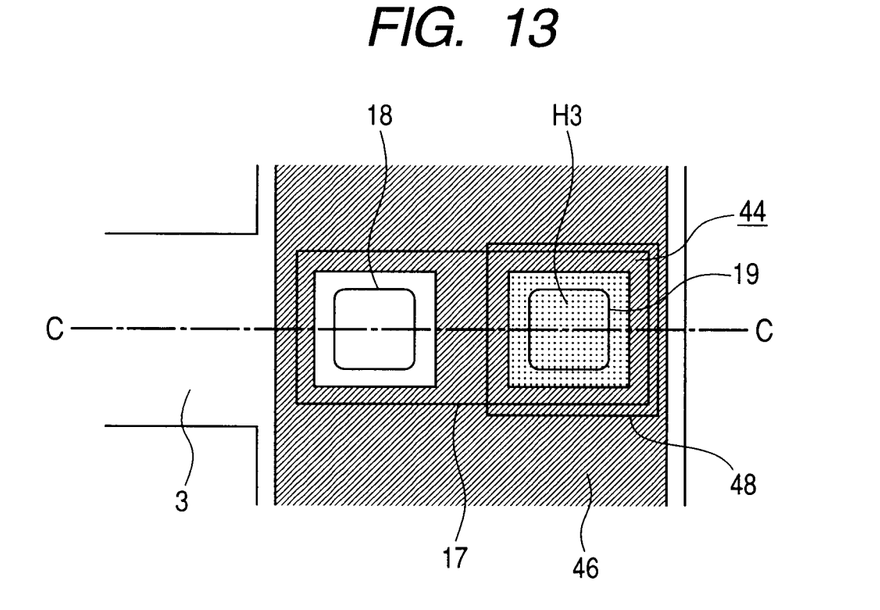
FIG. 13 is a plan view showing a portion where a common wiring conversion portion is enlarged according to embodiment 2.
Figure 14:
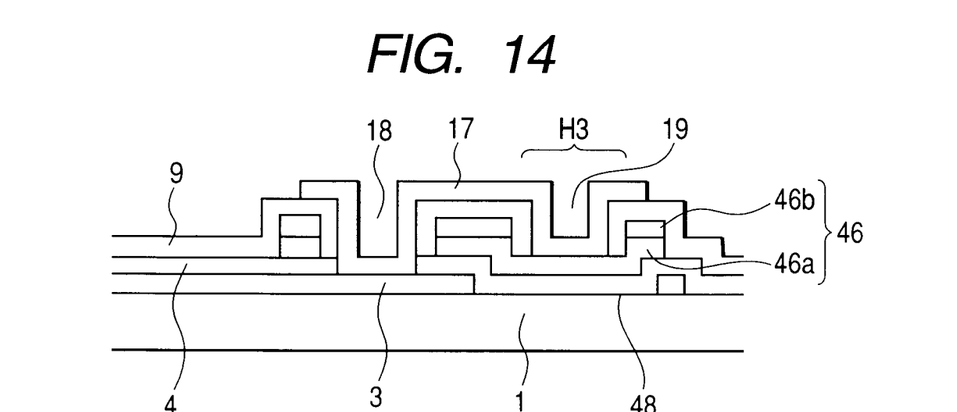
FIG. 14 is a sectional view taken along a line C-C of FIG. 13 according to embodiment 2.

In this case, as shown in FIGS. 9 to 12, the thin film patterns 12, 15 made of the first conductive film are not placed in substantially entire regions on the bottom layers of the regions H1, H2 of the drain electrode 8 and source terminal 62 in the embodiment 1. As shown in FIGS. 13 and 14, in the common wiring conversion part 44, removal portion 48 is provided on the common wiring 3 in substantially entire region on the bottom layer of the region H3 of the common connection wiring 46 such that a part of the common wiring 3 is removed. As such, the intermediate resist film thickness can be made uniform even by the flat structure that the thin film patterns 12, 15 and the common wiring 3 which are made of the first conductive film are not formed in substantially entire regions on the bottom layers of the regions H1, H2, H3. Further, since a process margin can be expanded, the defective patterns are reduced, and the yield can be improved.

Embodiment 3

In Embodiment 1, the thin film patterns 12, 15 and the common wiring 3 which are made of the first conductive film are formed in substantially entire regions on the bottom layers of the regions H1, H2, H3 in which intermediate resist film thickness is formed are processed by an intermediate exposure amount which does not completely expose a resist. However, even if the thin film patterns made of the same layer as a semiconductor film 5 instead of the first conductive film are formed, the heights can be made substantially uniform. In addition, even in a case where not only the gate wiring 2 and the semiconductor 5 are substantially the same in film thickness but also the thin film patterns are placed with the first conductive film and the semiconductor film 5 mixed. Accordingly, the heights from the substrate 1 can be made substantially uniform and the intermediate resist film thickness can be made uniform. Further, since the process margin can be expanded, the abnormal thin film patterns are reduced, and the yield can be improved.

Embodiment 4

Figure 15:
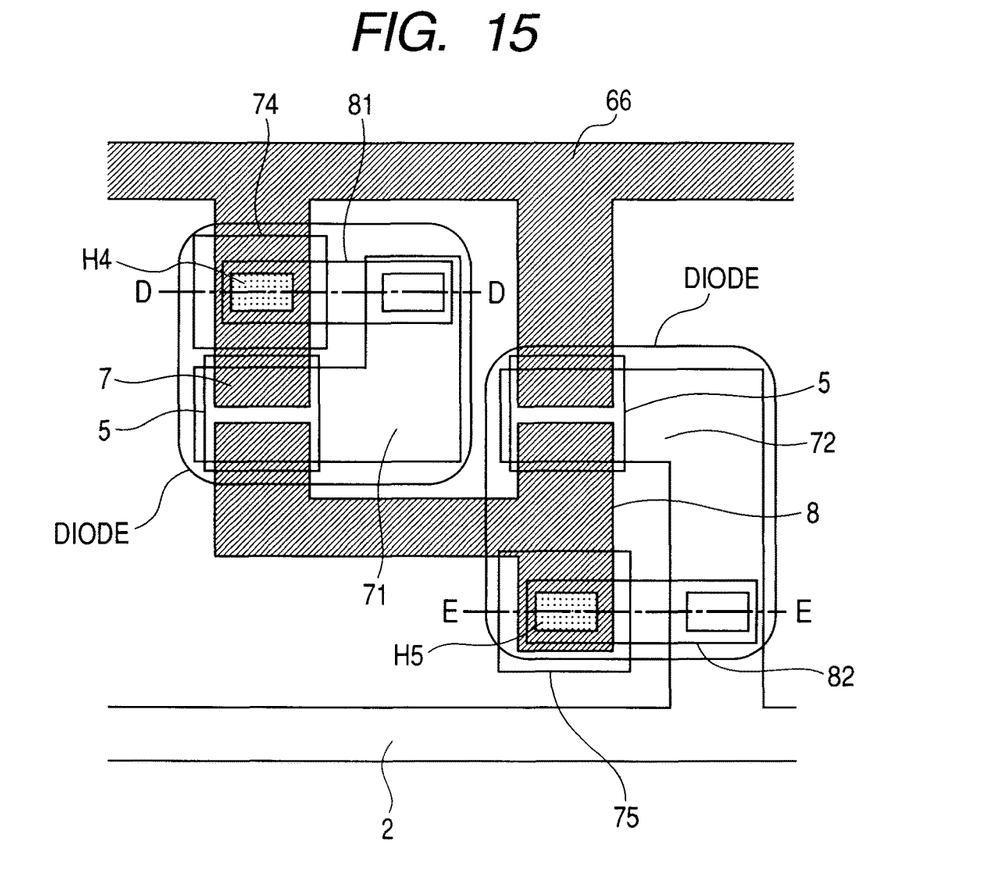
FIG. 15 is a plan view showing a portion where an electrostatic protection circuit is enlarged according to embodiment 4.
Figure 16:
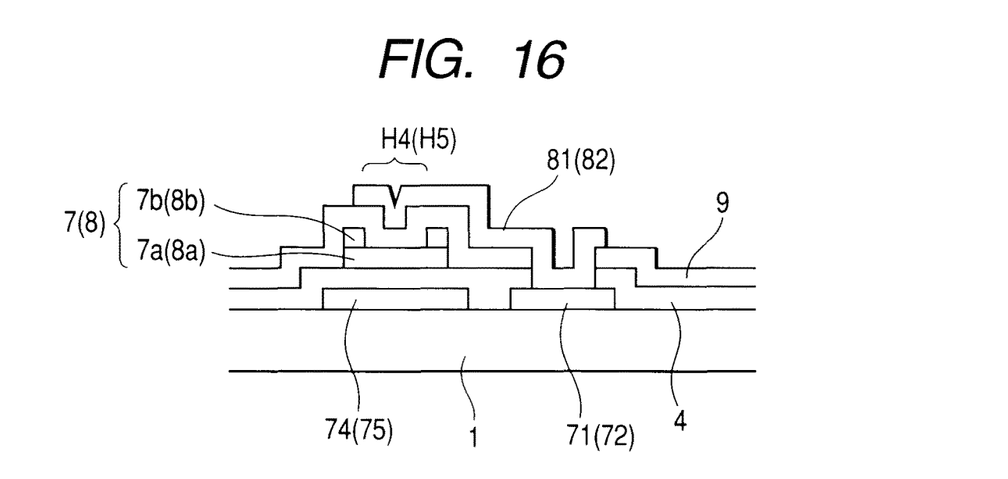
FIG. 16 is a sectional view taken along lines D-D and E-E of FIG. 15 according to embodiment 4.

Although a description was given of three regions H1, H2 and H3 in Embodiment 1 through 3, Embodiment 4 is applicable to other points. FIG. 15 is a plan view showing a portion where an electrostatic protection circuit is enlarged in Embodiment 4. FIG. 16 is a sectional view taken along the cut-off lines D-D and E-E in FIG. 15, codes in the brackets in FIG. 16 are those for the cut-off line E-E, and the sectional structures are basically identical to each other. Embodiment 4 shows an electrostatic protection circuit for gate wiring 2 secured outside the display part. The electrostatic protection circuit for the gate wiring 2 is a circuit composed of two diodes each having different rectification directions to disperse electrostatic charge to a short-circuit wiring 66 consisting of the second conductive film when positive or negative high voltage of several tens of volts or more such as static electricity is applied to the gate wiring 2. The diodes can be formed in the same process as that for pixel TFT. That is, it is possible to form the diodes by connecting gate electrodes 71 and 72 consisting of the first conductive film to one of the source electrode 7 and the drain electrode 8 consisting of the second conductive film.

The regions H4 and H5 shown by dotted lines in FIG. 15 are thin film patterns which are processed by an intermediate exposure amount which does not completely expose a resist with an intermediate resist film thickness formed. In the region H4, the upper film layer 7b of the source electrode 7 is removed, and the lower film layer 7a is exposed. In the region H5, the upper film layer 8b of the drain electrode 8 is removed, and the lower film layer 8a is exposed. As shown in FIG. 16, thin film patterns 74 and 75 formed of the first conductive film are formed almost on the entire region of the lower layer of the regions H4 and H5, and the heights thereof are made identical to the heights of the regions H1, H2 and H3 of Embodiment 1. And, the gate electrodes 71 and 72 composed of the first conductive film and the lower film layers 7a and 8a of the second conductive film are connected to each other by connection films 81 and 82 which are formed of conductive oxide films such as the same ITO as in the pixel electrode 11.

Herein, a description was given of the electrostatic protection circuit for the gate wiring 2. However, the electrostatic protection circuit for the source wiring 6 may be composed as in the above. That is, outside the display part, the source wiring 6 has a shape corresponding to the short-circuit wiring 66 in FIG. 15, wherein it is sufficient that the short-circuit wiring 66 is composed of the first conductive film, and is provided with a shape corresponding to the gate wiring 2 in FIG. 15.

Embodiment 5

As a point other than the above, Embodiment 5 is applicable to a connection portion for connecting the gate wiring 2 formed of the first conductive film to the gate terminal 60 by converting the gate wiring 2 to a gate terminal film formed of the second conductive film outside the display part so that the gate terminal 60 has the same structure and height as those of the source terminal 62. In addition, Embodiment 5 is applicable to a connection portion for connecting the source wiring 6 formed of the second conductive film to the source terminal 62 by converting the source wiring 6 to the source terminal film formed of the first conductive film outside the display part so that the source terminal 62 has the same structure and height as those of the gate terminal 60. Thus, in the connection portion to connect the first conductive film and the second conductive film together, it is sufficient that the sectional structure of the region which is processed by an intermediate exposure amount which does not completely expose a resist with an intermediate resist film thickness formed is made to the same heights of the region H3 of a common wiring conversion portion 44, which is made into the same connection structure, and the regions H4 and H5 of the electrostatic protection circuit.

The embodiments mentioned above describe an array substrate for a liquid crystal display device, but the present invention is applicable to array substrates for electro luminescence (EL) display devices, electrochromic devices, and display devices such as electronic paper using minute particles and drops of oil.

What is claimed is:
1. An array substrate comprising:
a substrate;
a first conductive film;
an insulation film formed on the first conductive film; and
a second conductive film formed on the insulation film, the second conductive film including a plurality of regions including upper thin film patterns formed by processing a resist to form an intermediate resist film thickness by an intermediate exposure amount which does not completely expose the resist,
wherein the first conductive film includes a common wiring and a thin film pattern formed in an entire area below each of the plurality of regions including the upper thin film patterns of the second conductive film, and heights of the thin film patterns of the first conductive film from the substrate are the same, and wherein the thin film pattern is electrically-isolated from other wirings.
2. The array substrate according to claim 1, further comprising:
a semiconductor film formed on the insulation film, including a lower thin film pattern formed in an entire area below at least one of the plurality of regions including the upper thin film patterns, and heights of the lower thin film patterns from the substrate are the same.
3. The array substrate according to claim 1,
wherein the second conductive film includes a multilayer film having at least two layers, and at least an upper layer film of the second conductive film is removed in at least one of the plurality of regions.
4. The array substrate according to claim 1, wherein the upper thin film patterns in the plurality of regions include at least two of a drain electrode thin film pattern, a source terminal thin film pattern, and a common wiring conversion part thin film pattern.
5. The array substrate according to claim 1, wherein the upper thin film patterns in the plurality of regions include at least two of a drain electrode thin film pattern, a source terminal thin film pattern, and a common wiring conversion part thin film pattern.
6. The array substrate according to claim 1, wherein the plurality of regions include at least three laminated structures.
7. The array substrate according to claim 1, wherein the plurality of regions include at least three laminated structures.
8. The array substrate according to claim 1, wherein a pixel in a display part, a source terminal, and a common wiring conversion portion are formed in the plurality of regions, and
wherein the thin film pattern is formed in an entire area below at least the pixel in the display part and the source terminal.
9. The array substrate according to claim 1, wherein the thin film pattern is formed only in an entire area below each of the plurality of regions including the upper thin film patterns of the second conductive film, and
wherein, in the plurality of regions, heights of the upper thin film pattern in the second conductive film from the substrate are the same as each other.
10. The array substrate according to claim 1, wherein the upper thin film patterns of the second conductive film include at least one of a source terminal film, a source electrode and a drain electrode of an electrostatic protection circuit.
11. The array substrate according to claim 1, further comprising:
an interlayer insulating film, which covers the upper thin film patterns of the second conductive film; and
a pixel electrode, which is in contact with the upper thin film pattern via a contact hole opened in the interlayer insulating film,
wherein the contact hole is overlapped with the thin film pattern, as viewed from above.
12. The array substrate according to claim 1, wherein the thin film pattern is electrically-isolated from at least the common wiring and a gate wiring.
13. The array substrate according to claim 1, wherein the thin film pattern is electrically-isolated from all other wirings so that there is not any voltage applied to the thin film pattern.

14. A display device using an array substrate, the array substrate comprising:
a substrate;
a first conductive film;
an insulation film formed on the first conductive film; and
a second conductive film formed on the insulation film, the second conductive film including a plurality of regions including upper thin film patterns formed by processing a resist to form an intermediate resist film thickness by an intermediate exposure amount which does not completely expose the resist,
wherein the first conductive film includes a common wiring and a thin film pattern formed in an entire area below each of the plurality of regions including the upper thin film patterns of the second conductive film, and heights of the thin film patterns of the first conductive film from the substrate are the same, and
wherein the thin film pattern is electrically-isolated from other wirings.

15. The display device according to claim 14, wherein the upper thin film patterns in the plurality of regions include at least two of a drain electrode thin film pattern, a source terminal thin film pattern, and a common wiring conversion part thin film pattern.

16. A method for manufacturing an array substrate, comprising:
forming an insulation film on a first conductive film;
forming a second conductive film on the insulation film, the second conductive film including a plurality of regions including upper thin film patterns, and the forming the second conductive film including
forming a resist, and
processing the resist to form an intermediate resist film thickness by an intermediate exposure amount which does not completely expose the resist; and
forming a common wiring and thin film patterns of the first conductive film in an entire area below each of the plurality of regions including the upper thin film patterns of the second conductive film such that heights of the thin film patterns of the first conductive film from the substrate are the same,
wherein the thin film patterns are electrically-isolated from other wirings.

17. The method according to claim 16, wherein forming the second conductive film includes:
forming, in the second conductive film, a multilayer film having at least two layers; and
removing at least an upper layer film of the second conductive film in each of the plurality of regions.

* * * * *